Patented Feb. 19, 1924.

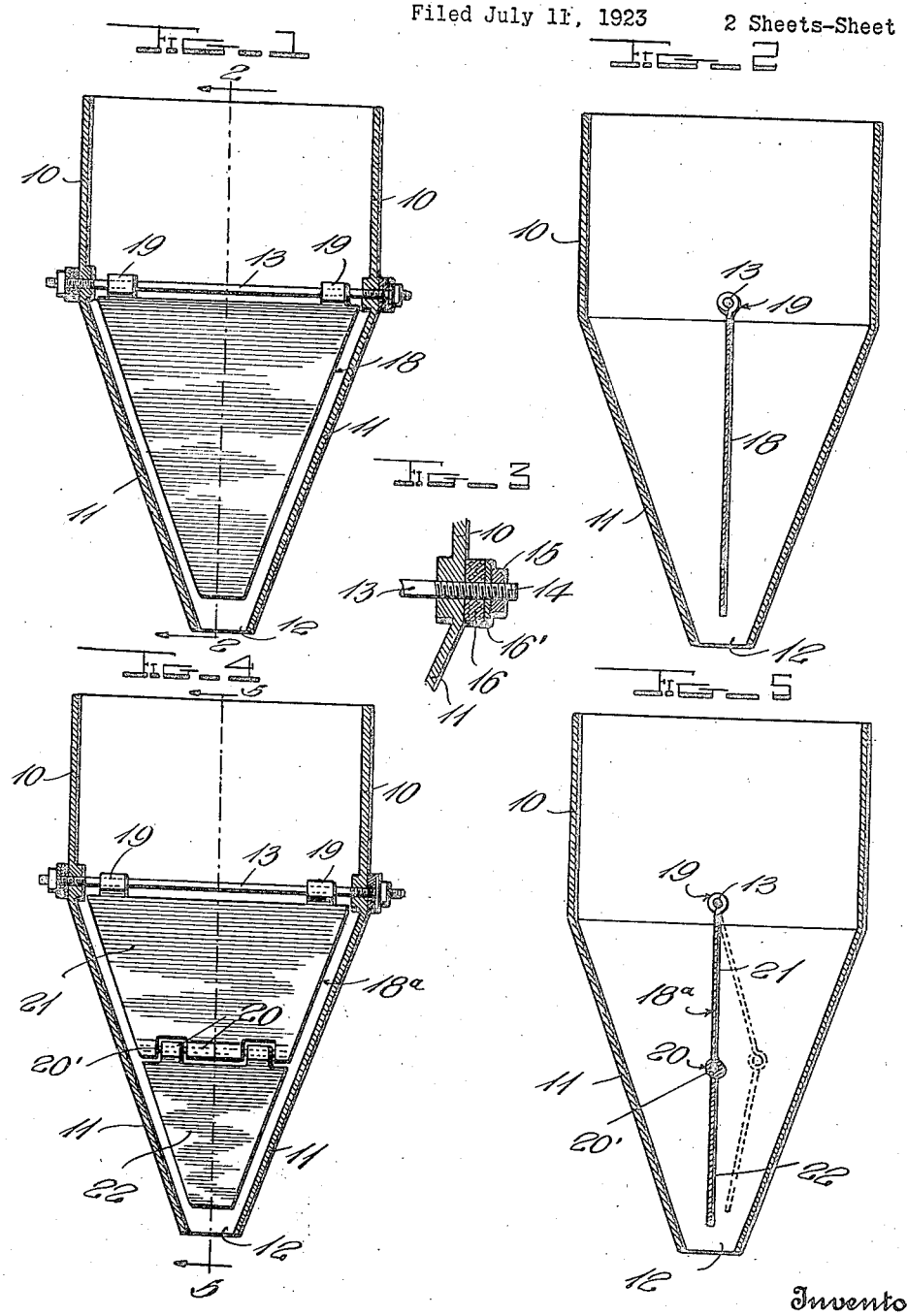

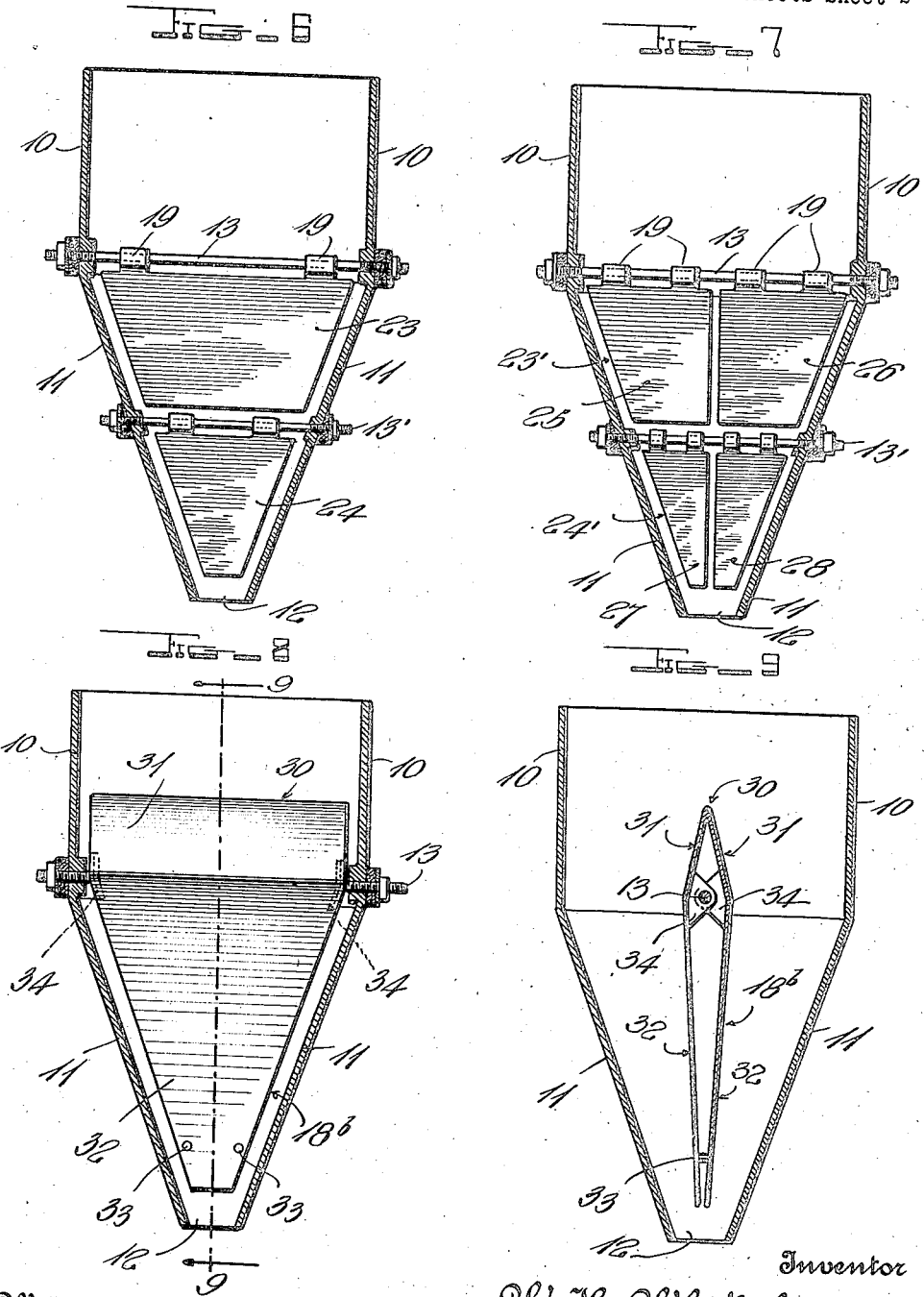

1,484,599

UNITED STATES PATENT OFFICE.

WILLIAM H. WHITAKER, OF SHELBYVILLE, ILLINOIS.

SELF-AGITATING HOPPER.

Application filed July 11, 1923. Serial No. 650,970.

*To all whom it may concern:*

Be it known that I, WILLIAM H. WHITAKER, a citizen of the United States, residing at Shelbyville, in the county of Shelby and State of Illinois, have invented certain new and useful Improvements in Self-Agitating Hoppers; and I do declare the following to be a full, clear, and exact description of the invention, such as will enable others skilled in the art to which it appertains to make and use the same.

I have for the principal object of my invention a device of the above mentioned character whereby a continuous flow of material (principally granulated or powdered coal) may be fed from a hopper or tank without packing, arching or bridging within the hopper or tank.

A further object of my invention is to provide a device of the above mentioned character, which eliminates the use of mechanically operated agitators.

With the foregoing in view, the invention resides in the novel subject matter hereinafter described and claimed, the description being supplemented by the accompanying drawings.

Figure 1 represents a vertical sectional view of a hopper incorporating my invention;

Figure 2 is a vertical sectional view on the line 2—2 of Fig. 1;

Figure 3 is a fragmental sectional view showing the means of attaching the agitating means to a hopper;

Figure 4 is a vertical sectional view of a modified form of my invention;

Figure 5 is a vertical sectional view on the line 5—5 of Fig. 4;

Figure 6 is a vertical sectional view of a still further modified form of my invention;

Figure 7 is a vertical longitudinal sectional view of a still further modified form of my invention;

Figure 8 is a vertical sectional view showing still another form of construction;

Figure 9 is a sectional view on line 9—9 of Fig. 8.

In the drawings wherein for the purpose of illustration only preferred embodiments of my invention are shown and in which like characters of reference are employed to designate like parts throughout the several views, the numerals 10 designate the perpendicular walls of a tank or hopper having converging lower walls 11, which terminate in an opening or mouth 12 in the usual manner.

Through the hopper near the base of the perpendicular walls 10 and directly over the opening 12 is passed a horizontally disposed rod 13. This rod is preferably screw-threaded at both ends as at 14 (Fig. 3) and fastened by means of a nut 15 at each end and felt washers 16 and iron washers 16' interposed between the nuts and the hopper, as shown clearly in Fig. 3.

On the rod 13 is hung, preferably by means of upstanding knuckles 19 (Figs. 1 to 7), a downwardly tapered agitating plate 18 (Figs. 1 and 2), shaped to conform with the converging walls 11 of the hopper and depending from the rod 13 to a point near the mouth 12 of the hopper. The plate 18 is constructed of thin metal and is adapted to oscillate in a manner hereinafter described.

In the modified form illustrated in Figs. 4 and 5, the agitator 18$^a$ is hinged intermediate its upper and lower ends, for instance by knuckles 20 and a rod 20', forming the independently swinging members 21 and 22.

Figure 6 shows a further modified form wherein an additional rod 13' is passed through the hopper parallel with the rod 13 and between it and the mouth 12 of the hopper. On these rods are swung, in a manner similar to that shown in Fig. 1, tapered agitating plates 23 and 24 extending downwardly to the rod 13' and the mouth 12 respectively and each being adapted to oscillate independently of the other.

Figure 7 shows a still further modified embodiment of my invention wherein two parallel rods 13 and 13' are employed similar to Figure 6, but the plates 23' and 24' are comprised of sections 25, 26, 27 and 28 respectively, each of the four adapted to swing independently of the others.

In Figs. 8 and 9, I have illustrated another form of construction in which an agitator 18$^b$ is formed of a single metal plate bent transversely on itself on a central line 30 which forms the upper end of the agitator. From this bend, the two halves of the plate diverge slightly as seen at 31 to points opposite the pivot rod 13, and from this rod, said halves converge as at 32, their lower ends however, being held in slightly spaced relation by spacers 33, permitting any material which would otherwise lodge between the two halves of the plate, to fall out.

To connect the agitator with the rod 13, it may well have suitable ears 34 or other desired means may be provided to pivotally support the agitator. Also, attention may be directed to the fact that the agitator 18^b may be constructed otherwise than in the specific manner shown, as long as its general shape is maintained, as this shape insures against possible sticking of the material to or packing against the agitator.

It is known fact in the art of hopper and feeder constructions that a continuous flow of material will pass without interruption through a hopper constructed with one perpendicular wall, whereas with all the walls converging toward a central opening it often occurs that the material binds and clogs in the hopper unless a mechanically operated agitator is employed. In the operation of my device the central plate or agitator acts both as a perpendicular wall virtually dividing a hopper having converging walls, into two hoppers each having a perpendicular wall as shown in Fig. 2; and as an automatic agitator to insure a continuous flow of material, the agitator being oscillated by the coal or other material falling at opposite sides thereof.

It must be understood that my device may be attached to any form of tank or hopper either square or cylindrical and further that any departure such as in shape, size or arrangement of parts may be resorted to without departing from the spirit of my invention as claimed.

I claim:

1. In a hopper, a plate arranged therein, means for movably mounting said plate to permit it to provide a loosely mounted perpendicular wall extending entirely across the hopper, whereby said wall divides the hopper into separate passages and is given the additional function of an automatic agitator.

2. In a hopper, combined means for forming a loosely mounted perpendicular wall extending entirely across said hopper and for forming an automatic agitator, said means comprising at least one horizontal rod passing across said hopper and attached to the same and at least one downwardly extending rod-supported oscillating plate conforming substantially in shape with said hopper.

3. A hopper and a loosely hung pivotally mounted agitator in said hopper free of connection with mechanical operating means, said agitator having the upper ends of its sides diverging downwardly to a plane adjacent the agitator pivot and then converging downwardly.

4. A hopper and a loosely hung pivotally mounted agitator therein free of connection with mechanical operating means, said agitator comprising two side walls connected with each other at their upper ends and spaced apart at their lower ends, said walls diverging downwardly to a plane adjacent to the agitator axis and then converging downwardly.

In testimony whereof I have hereunto affixed my signature.

WILLIAM H. WHITAKER.